US010682807B2

(12) United States Patent
Batchelder

(10) Patent No.: US 10,682,807 B2
(45) Date of Patent: Jun. 16, 2020

(54) ADDITIVE MANUFACTURING SYSTEM AND PROCESS WITH PRECISION SUBSTRACTIVE TECHNIQUE

(71) Applicant: Stratasys, Inc., Eden Prairie, MN (US)

(72) Inventor: J. Samuel Batchelder, Somers, NY (US)

(73) Assignee: STRATASYS, INC., Eden Prairie, MN (US)

(*) Notice: Subject to any disclaimer, the term of this patent is extended or adjusted under 35 U.S.C. 154(b) by 233 days.

(21) Appl. No.: 15/945,140

(22) Filed: Apr. 4, 2018

(65) Prior Publication Data
US 2018/0222110 A1 Aug. 9, 2018

Related U.S. Application Data

(63) Continuation of application No. 14/026,704, filed on Sep. 13, 2013, now Pat. No. 9,950,474.

(51) Int. Cl.
| | | |
|---|---|---|
| *B29C 64/112* | (2017.01) | |
| *B29C 48/02* | (2019.01) | |
| *B29C 48/265* | (2019.01) | |
| *B29C 48/25* | (2019.01) | |
| *B33Y 10/00* | (2015.01) | |
| *B33Y 30/00* | (2015.01) | |
| *B29C 64/106* | (2017.01) | |
| *B29C 64/20* | (2017.01) | |

(52) U.S. Cl.
CPC .......... *B29C 64/112* (2017.08); *B29C 48/02* (2019.02); *B29C 48/265* (2019.02); *B29C 48/266* (2019.02); *B29C 64/106* (2017.08); *B29C 64/20* (2017.08); *B33Y 10/00* (2014.12); *B33Y 30/00* (2014.12)

(58) Field of Classification Search
CPC ..................................................... B29C 64/112
See application file for complete search history.

(56) References Cited

U.S. PATENT DOCUMENTS

| | | | |
|---|---|---|---|
| 4,479,347 | A | 10/1984 | Larsen et al. |
| 4,797,313 | A | 1/1989 | Stolk et al. |
| 5,121,329 | A | 6/1992 | Crump |
| 5,169,081 | A | 12/1992 | Goedderz |
| 5,303,141 | A | 4/1994 | Batchelder et al. |
| 5,312,224 | A | 5/1994 | Batchelder et al. |
| 5,340,433 | A | 8/1994 | Crump |
| 5,342,687 | A | 8/1994 | Iwai et al. |
| 5,503,785 | A | 4/1996 | Crump et al. |
| 5,738,817 | A | 4/1998 | Danforth et al. |

(Continued)

FOREIGN PATENT DOCUMENTS

EP 1448359 B1 7/2007

OTHER PUBLICATIONS www.3ders.org, "3D printer and 3D printing news", available prior to Oct. 31, 2013, 13 pages.

(Continued)

*Primary Examiner* — Larry W Thrower
(74) *Attorney, Agent, or Firm* — Westman, Champlin & Koehler, P.A.

(57) ABSTRACT

An additive manufacturing system and process for producing three-dimensional parts, which includes forming layers of the three-dimensional part from a part material at a first resolution, and ablating selected voxels of the formed layers with a laser beam at a second resolution that is higher than the first resolution.

9 Claims, 11 Drawing Sheets

(56) References Cited

U.S. PATENT DOCUMENTS

| | | |
|---|---|---|
| 5,764,521 A | 6/1998 | Batchelder et al. |
| 5,866,058 A | 2/1999 | Batchelder et al. |
| 5,900,207 A | 5/1999 | Danforth et al. |
| 5,939,008 A | 8/1999 | Comb et al. |
| 5,968,561 A | 10/1999 | Batchelder et al. |
| 6,004,124 A | 12/1999 | Swanson et al. |
| 6,022,207 A | 2/2000 | Dahlin et al. |
| 6,054,077 A | 4/2000 | Comb et al. |
| 6,067,480 A | 5/2000 | Stuffle et al. |
| 6,070,107 A | 5/2000 | Lombardi et al. |
| 6,085,957 A | 7/2000 | Zinniel et al. |
| 6,129,872 A | 10/2000 | Jang |
| 6,228,923 B1 | 5/2001 | Lombardi |
| 6,257,517 B1 | 7/2001 | Babish et al. |
| 6,547,995 B1 | 4/2003 | Comb |
| 6,645,412 B2 | 11/2003 | Priedeman, Jr. |
| 6,685,866 B2 | 2/2004 | Swanson et al. |
| 6,722,872 B1 | 4/2004 | Swanson et al. |
| 6,730,252 B1 | 5/2004 | Teoh et al. |
| 6,749,414 B1 | 6/2004 | Hanson et al. |
| 6,790,403 B1 | 9/2004 | Priedeman, Jr. et al. |
| 6,814,907 B1 | 11/2004 | Comb |
| 6,869,559 B2 | 3/2005 | Hopkins |
| 6,923,634 B2 | 8/2005 | Swanson et al. |
| 6,998,087 B1 | 2/2006 | Hanson et al. |
| 7,122,246 B2 | 10/2006 | Comb et al. |
| 7,127,309 B2 | 10/2006 | Dunn et al. |
| 7,172,715 B2 | 2/2007 | Swanson et al. |
| 7,363,686 B2 | 4/2008 | Fukuyasu et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,744,364 B2 | 6/2010 | Turley et al. |
| 7,891,964 B2 | 2/2011 | Skubic et al. |
| 7,896,209 B2 | 3/2011 | Batchelder et al. |
| 8,153,182 B2 | 4/2012 | Comb et al. |
| 8,221,669 B2 | 7/2012 | Batchelder et al. |
| 8,236,227 B2 | 8/2012 | Batchelder et al. |
| 8,419,996 B2 | 4/2013 | Swanson et al. |
| 9,156,194 B2 | 10/2015 | Ng et al. |
| 2004/0217095 A1 | 11/2004 | Herzog |
| 2005/0129941 A1 | 6/2005 | Comb et al. |
| 2007/0003656 A1 | 1/2007 | LaBossiere et al. |
| 2007/0120240 A1 | 5/2007 | Foo et al. |
| 2007/0228590 A1 | 10/2007 | LaBossiere et al. |
| 2008/0038396 A1 | 2/2008 | John et al. |
| 2008/0109103 A1 | 5/2008 | Gershenfeld et al. |
| 2009/0035405 A1 | 2/2009 | Leavitt |
| 2009/0263582 A1 | 10/2009 | Batchelder |
| 2009/0273122 A1 | 11/2009 | Batchelder et al. |
| 2009/0274540 A1 | 11/2009 | Batchelder et al. |
| 2010/0018924 A1 | 1/2010 | Fendya et al. |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |
| 2010/0100224 A1 | 4/2010 | Comb et al. |
| 2010/0283172 A1 | 11/2010 | Swanson |
| 2010/0308968 A1 | 12/2010 | Tamm et al. |
| 2010/0327479 A1 | 12/2010 | Zinniel et al. |
| 2011/0074065 A1 | 3/2011 | Batchelder et al. |
| 2011/0076495 A1 | 3/2011 | Batchelder et al. |
| 2011/0076496 A1 | 3/2011 | Batchelder et al. |
| 2011/0117268 A1 | 5/2011 | Batchelder et al. |
| 2011/0121476 A1 | 5/2011 | Batchelder et al. |
| 2011/0233804 A1 | 9/2011 | Batchelder et al. |
| 2012/0018924 A1 | 1/2012 | Swanson et al. |
| 2012/0068378 A1 | 3/2012 | Swanson et al. |
| 2012/0070523 A1 | 3/2012 | Swanson et al. |
| 2012/0164256 A1 | 6/2012 | Swanson et al. |
| 2013/0078073 A1 | 3/2013 | Comb et al. |

OTHER PUBLICATIONS http://en.wikipedia.org/wiki/Laser_surface_velocimeter, "Laser surface velocimerter", Mar. 22, 2013, pp. 1-3.

http://en.wikipedia.org/wiki/Velocimetry, "Velocimetry", Jun. 25, 2012, pp. 1-2.

ADDITIVE MANUFACTURING SYSTEM AND PROCESS WITH PRECISION SUBSTRACTIVE TECHNIQUE

CROSS-REFERENCE TO RELATED APPLICATIONS

This Application is a Continuation Application of U.S. patent application Ser. No. 14/026,704, filed Sep. 13, 2013, the contents of which are hereby incorporated by reference in their entireties.

BACKGROUND

The present disclosure relates to additive manufacturing systems for producing three-dimensional (3D) parts and support structures. In particular, the present disclosure relates to a system and process for printing 3D parts and support structures in a layer-by-layer manner, in coordination with a precision subtractive technique to produce high-resolution features.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a platen in planar layers. The extruded part material fuses to previously deposited part material, and solidifies upon a drop in temperature. The position of the print head relative to the substrate is then incremented, and the process is repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited pursuant to the generated geometry during the printing process. The support material adheres to the part material during fabrication, and is removable from the completed 3D part when the printing process is complete.

SUMMARY

An aspect of the present disclosure is directed to an additive manufacturing system for producing 3D parts. The system includes a platen and a moveable head configured to form layers of the 3D part from a part material at a first resolution onto the platen. The system also includes a radiation-emitting device configured to emit high-peak-power synergistic radiation (e.g., laser beam pulses), and a masking unit configured to spatially modulate the emitted radiation towards the formed layers of the 3D part to ablate selected voxels of the formed layers at a second resolution that is higher than the first resolution, and at least one controller configured to manage operations of the moveable head and the laser device.

Another aspect of the present disclosure is directed to an additive manufacturing farm, which includes a plurality of additive manufacturing systems, each configured to print 3D parts in a layer-by-layer manner. The farm also includes at least one laser device optically connected to each of the plurality of additive manufacturing systems, where the at least one laser device is configured to emit laser beam pulses to printed layers in the additive manufacturing systems to ablate selected voxels of the printed layers. The farm further includes a computer-based system configured to manage operations of the plurality of additive manufacturing systems and the at least one laser device to coordinate the emitting of the laser beam pulses between the additive manufacturing systems.

Another aspect of the present disclosure is directed to a method for producing a three-dimensional part with an additive manufacturing system. The method includes forming a layer of a part material with the additive manufacturing system using a first resolution, scanning the printed layer to generate a scanned map of the formed layer, and comparing the scanned map of the formed layer to a sliced layer corresponding to the formed layer. The method also includes identifying at least one region of difference between the scanned map and the sliced layer, and ablating the part material at the at least one identified region in the formed layer with laser beam pulses having a second resolution that is higher than the first resolution.

DEFINITIONS

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

DETAILED DESCRIPTION

The present disclosure is directed to a system and process for printing 3D parts and/or support structures in a layer-by-layer manner using an additive manufacturing technique, which is performed in coordination with a precision subtractive technique, preferably involving laser ablation (or ablation by other high-peak-power synergistic radiation). In particular, as discussed below, after each layer of a part or support material is printed, a laser beam of a suitable wavelength and pulse duration may ablate away one or more portions of the printed layer to define high-resolution features (e.g., high-resolution exterior and/or interior surfaces) for the given layer. This combination allows 3D parts and support structures to be produced with both high-resolution surfaces and high printing speeds.

Figure 1:
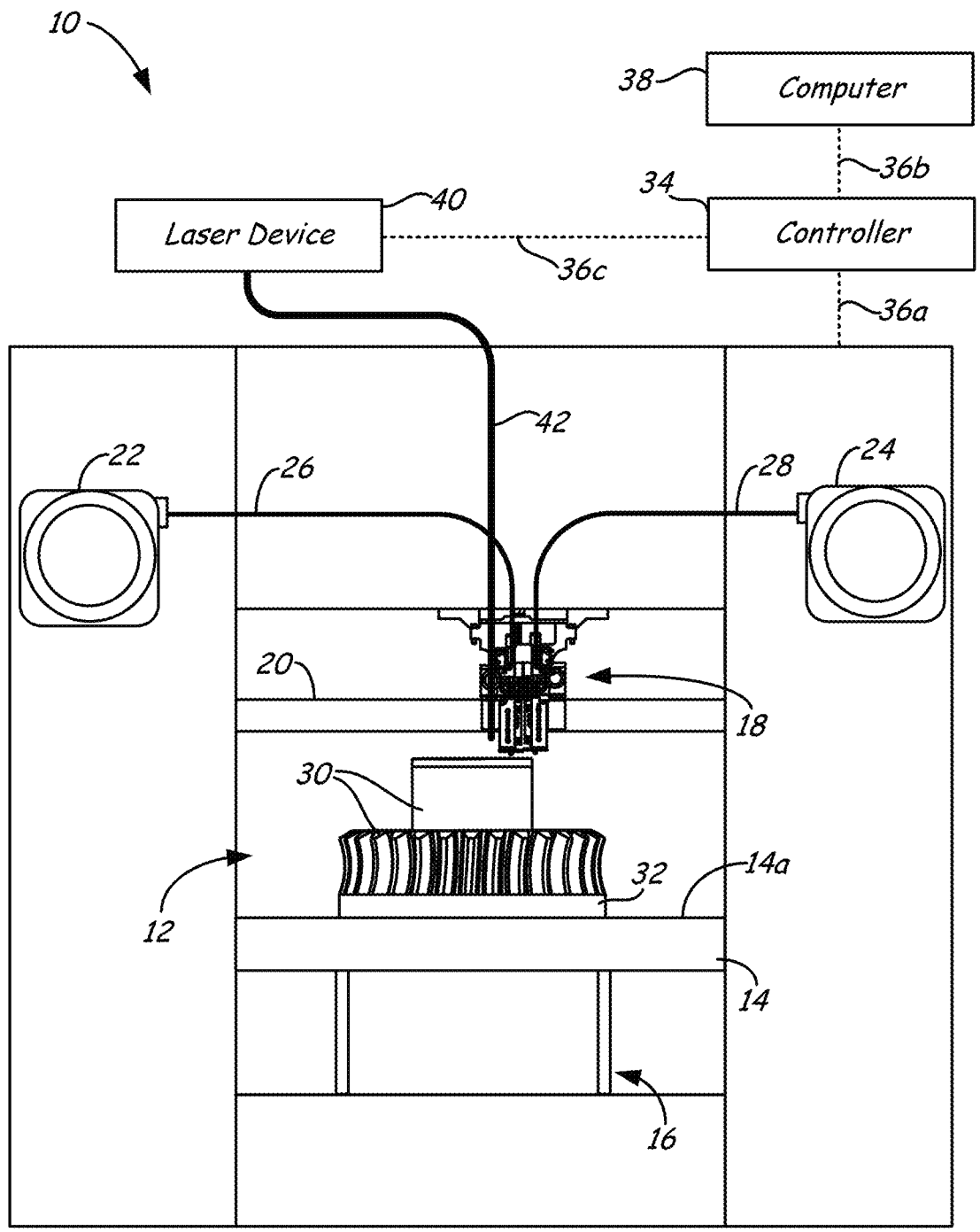
FIG. 1 is a front view of an additive manufacturing system configured to print 3D parts and support structures, and which includes a laser device for performing a precision subtractive technique.

FIG. 1 illustrates system 10, which is an example additive manufacturing system of the present disclosure for printing or otherwise building 3D parts and support structures using a layer-based, additive manufacturing technique, which operates in coordination with a precision subtractive technique as explained below. Suitable additive manufacturing systems for system 10 include extrusion-based additive manufacturing systems developed by Stratasys, Inc., Eden Prairie, Minn. under the trademarks "FDM" and "FUSED DEPOSITION MODELING". Alternatively, system 10 may be any suitable additive manufacturing system, such as those based on jetting, selective laser sintering, powder/binder jetting, electron-beam melting, electrophotography, and stereolithographic processes, and is particularly suitable for use with deposition-based additive manufacturing systems, such as extrusion-based and jetting-based systems. In some embodiments, system 10 may be used to produce metal parts, where the laser ablation may burn the surfaces of metal parts from near-net (today's state-of-the-art) to net.

In the shown embodiment, system 10 includes chamber 12, platen 14, platen gantry 16, print head 18, head gantry 20, and consumable assemblies 22 and 24. Chamber 12 is an enclosed environment that contains platen 14 for printing 3D parts and support structures. Chamber 12 may be heated (e.g., with circulating heated air) to reduce the rate at which the part and support materials solidify after being extruded and deposited.

Alternatively, the heating may be localized rather than in an entire chamber 12. For example, the deposition region may be heated in a localized manner. Suitable techniques for locally-heating a deposition region include heating platen 14 and/or by directing hot air jets towards the 3D parts/support structures being printed, and/or by insulating a localized deposition region. The heating anneals the printed layers of the 3D parts (and support structures) to partially relieve the residual stresses, thereby reducing curling of the 3D parts. In alternative embodiments, chamber 12 may be omitted and/or replaced with different types of build environments. For example, a 3D part and support structure may be printed in a build environment that is open or partially open to ambient conditions or may be enclosed with alternative structures (e.g., flexible curtains).

Platen 14 is a platform on which 3D parts and support structures are printed in a layer-by-layer manner. In some embodiments, platen 14 may also include a flexible polymeric film, coating, liner, or tray, or other substrate on which the 3D parts and support structures are printed. In the shown example, print head 18 is a dual-tip extrusion head configured to receive consumable filaments from consumable assemblies 22 and 24 (e.g., via guide tubes 26 and 28) for printing 3D part 30 and support structure 32 on platen 14.

Consumable assembly 22 may contain a supply of a part material for printing 3D part 30. Correspondingly, consumable assembly 24 may contain a supply of the support material of the present disclosure for printing support structure 32 from the support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12.

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print 3D part 30 and support structure 32 along the x-axis or the y-axis. In other alternative embodiments, print head 18 may be movable along multiple linear and/or rotational axes.

System 10 also includes controller 34, which is one or more control circuits configured to monitor and operate the components of system 10. For example, one or more of the control functions performed by controller 34 can be implemented in hardware, software, firmware, and the like, or a combination thereof. Controller 34 may communicate over communication line 36a with chamber 12 (e.g., with a heating unit and/or air blower for chamber 12), platen gantry 16, print head 18, head gantry 20, and various sensors, calibration devices, display devices, and/or user input devices.

While illustrated as a single signal line, communication line 36a may include one or more electrical, optical, and/or wireless signal lines, allowing controller 34 to communicate with various components of system 10. Furthermore, while illustrated outside of system 10, controller 34 and communication line 36a may be internal components to system 10.

System 10 and/or controller 34 may also communicate with one or more computer-based systems, referred to as computer 38, which may include computer-based hardware, such as data storage devices, processors, memory modules and the like for generating, storing, and transmitting tool path and related printing instructions to system 10. Accordingly, computer 38 may also be external and/or internal to system 10. For example, computer 38 may be one or more external computer systems (e.g., desktop, laptop, server-based, cloud-based, tablet, mobile media device, and the like) configured to communicate with system 10 and/or controller 34 over one or more wired and/or wireless communication lines 36b. Alternatively, computer 38 may be internal to system 10, and may communicate with one or more external computer devices.

In some embodiments, controller 34 itself may perform one or more of the operations typically performed by computer 38 or other components of system 10, such as generating and storing tool path and related printing instructions, performing compiler functions, and the like. In further embodiments, controller 34 and computer 38 may be integrated into a common device that performs the operations of both controller 34 and computer 38. It is understood that computer-based calculations, data recording, data generation, data storage, and the like may be performed with the computer-based hardware and software of controller 34 and/or computer 38, such as with one or more processors and computer storage media, as is well known to those skilled in the art.

As further shown in FIG. 1, system 10 also includes laser device 40 for performing a laser ablation operation, as discussed below. Briefly, laser device 40 may communicate with controller 34 and/or computer 38 over one or more wired and/or wireless communication lines 36c for conducting the laser ablation in coordination with the printing of the layers of 3D part 30 and/or support structure 32. Preferred systems for laser device 40 include excimer laser system, picosecond laser systems, and the like, which are configured to generate laser beams of suitable wavelengths and pulse durations to ablate portions of the printed layers.

Ultraviolet-pulsed laser sources are advantageous because of their abrupt absorption depth. This confines the energy deposition just to the material being ablated, so that the remaining part material is not thermally damaged. For similar reasons, excimer lasers are used for eye surgery. Other energy deposition devices that emit high-peak-power synergistic radiation to selectively remove material by heating so localized may alternatively be used. For example, pulsed proton sourced from magnetically insulated diodes can achieve power densities of several joules per square centimeter, and have demonstrated ablation of thin layers. Very short temporal pulses of light of longer wavelengths than ultraviolet have also demonstrated ablation that is non-destructive to the adjoining material.

Preferably, laser device 40 is external to the housing of system 10, allowing a single laser device 40 to operate with a farm of multiple additive manufacturing systems (e.g., as shown below in FIG. 8). For instance, laser device 40 may include a optical conduit 42 (e.g., fiber optical cable) that extends into the housing of system 10, and may be supported by print head 18, head gantry 20, or by a separate gantry mechanism. This allows laser system 40 to emit the laser beam pulses into chamber 12, and towards the printed layers of 3D part 30 and/or support structure 32, while allowing laser device 40 itself to reside outside of chamber 12. This further protects laser device 40 from any heated environment in chamber 12.

As discussed further below, laser device 40 may also optically scan the printed layers through optical conduit 42, allowing laser device 40 to generate a scanned map of each printed layer. This allows laser device 40 (and/or computer 38) to identify where the laser ablation needs to be conducted for each printed layer.

For instance, in embodiments in which laser device 40 is an excimer laser device, it may include a laser beam generator, a beam homogenizer, a masking unit, a projection lens, and an optical scanner. One or more of these components may be located in laser device 40 and/or in the housing of system 10. In some embodiments, the masking unit and projection lens may be located within system 10 and/or chamber 12, and may be connected to laser device 40 via optical conduit 42. Alternatively, all of the components may be located in laser device 40, if desired, and the resulting laser beam may be emitted through optical conduit 42 into chamber 12.

Figure 2:
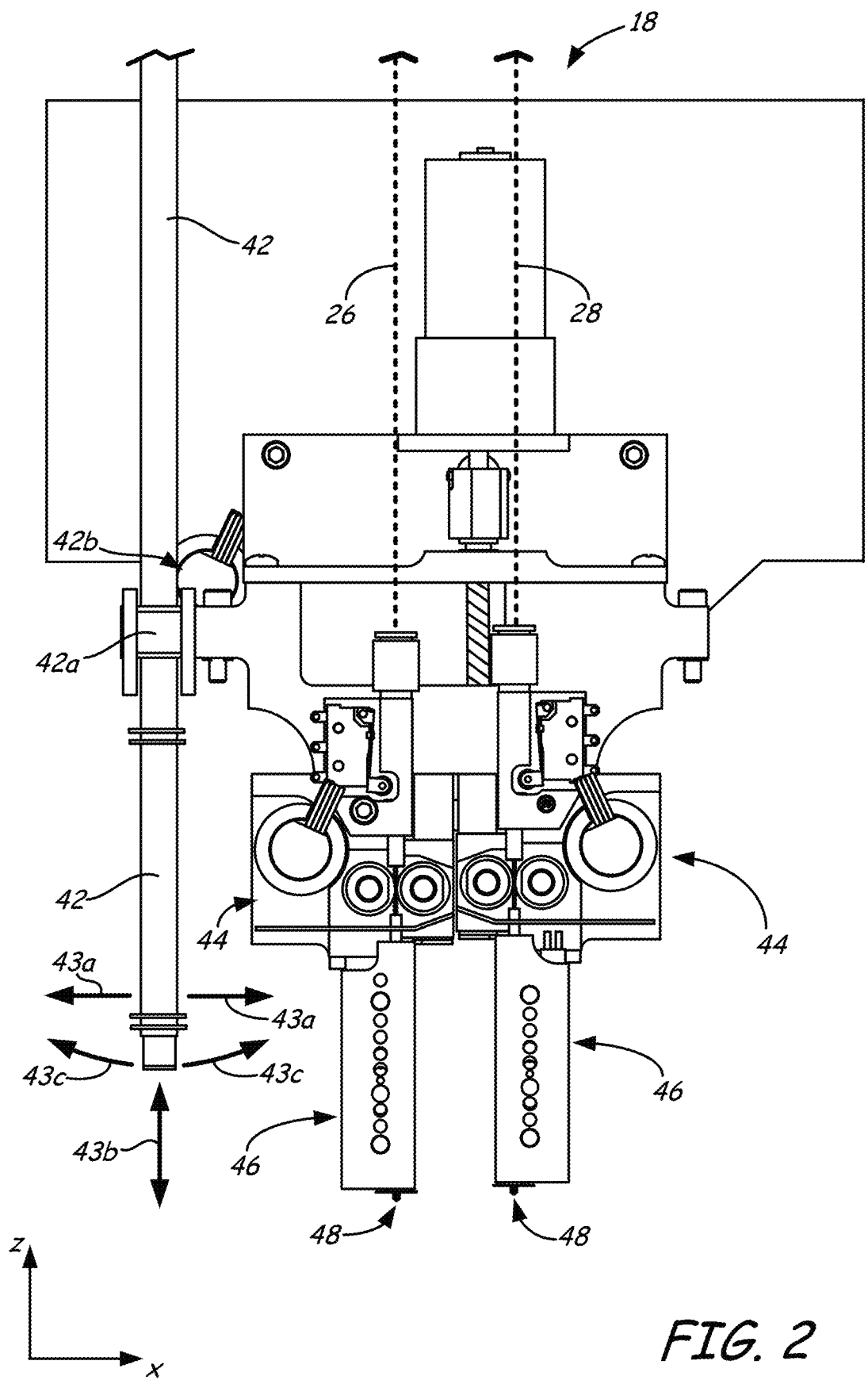
FIG. 2 is a front view of a print head of the additive manufacturing system.

FIG. 2 illustrates a suitable device for print head 18, as described in Leavitt, U.S. Pat. No. 7,625,200. Additional examples of suitable extrusion devices for print head 18, and the connections between print head 18 and head gantry 20 include those disclosed in Batchelder et al., U.S. Pat. No. 5,312,224; Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; Batchelder et al., U.S. Pat. No. 7,896,209; Skubic et al., U.S. Pat. No. 7,891,964; and Comb et al., U.S. Pat. No. 8,153,182. In additional embodiments, in which print head 18 is an interchangeable, single-nozzle print head, examples of suitable devices for each print head 18, and the connections between print head 18 and head gantry 20 include those disclosed in Swanson et al., U.S. Pat. No. 8,419,996. In further embodiments print head 18 may instead be a jetting head, a drop-on-demand head, or any alternative deposition device.

Figure 3:
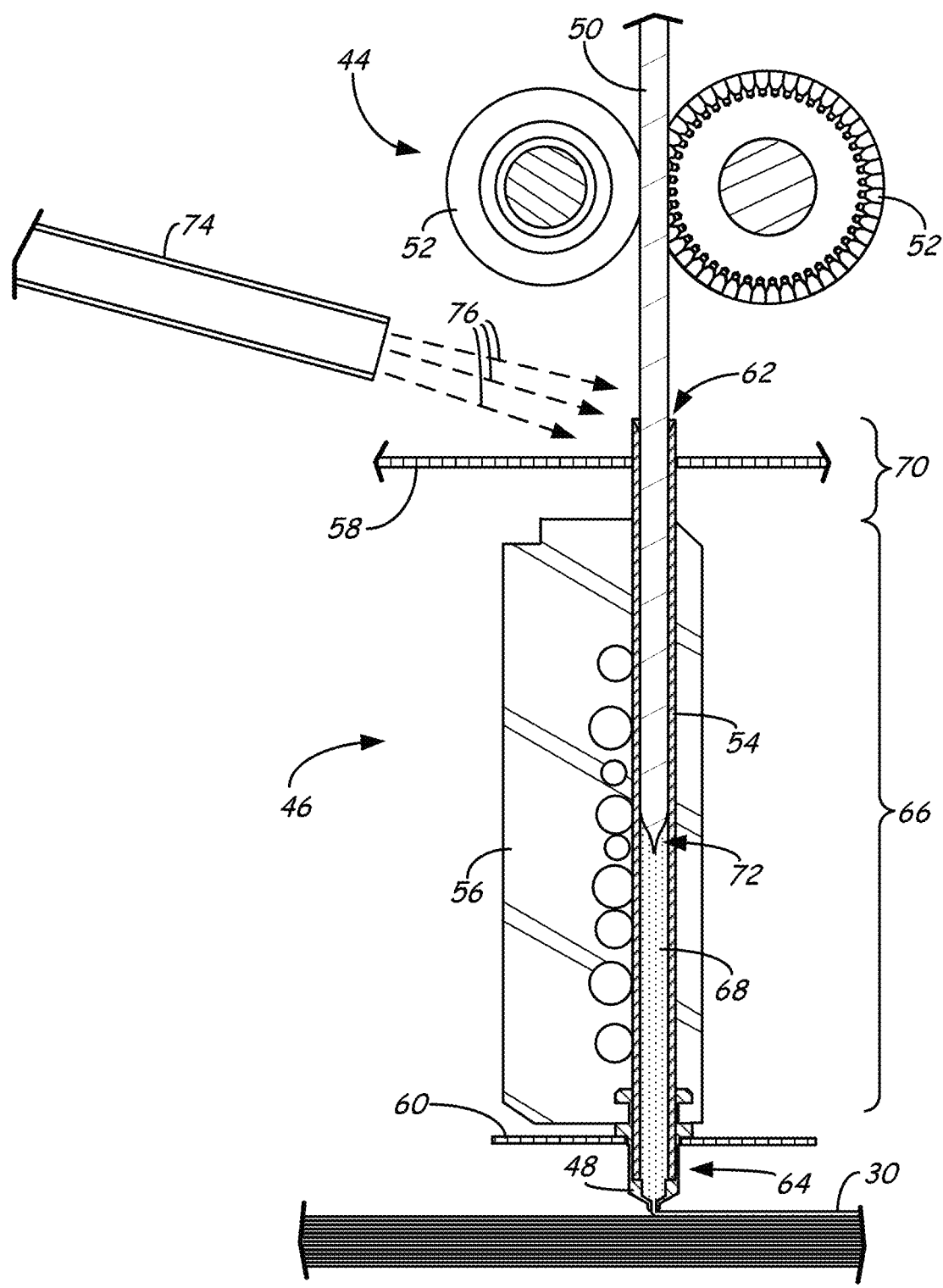
FIG. 3 is an expanded sectional view of a drive mechanism, a liquefier assembly, and a nozzle of the print head for use in the additive manufacturing system, along with a coupled optical conduit of the laser device.

In the shown dual-tip embodiment, print head 18 includes two drive mechanisms 44, two liquefier assemblies 46, and two nozzles 48, which are configured to respectively receive and extrude the part and support materials. In this embodiment, the part and support materials each preferably have a filament geometry for use with print head 18. For example, as best shown in FIG. 3, the part or support material may be provided as filament 50. In some embodiments, controller 34 may also servo or swap liquefier assemblies 46 between opposing active and stand-by states.

As further shown in this embodiment, print head 18 includes coupling mechanism 42a, which is configured to hold optical conduit 42. This allows head gantry 20 to move optical conduit 42 along with print head 18 in the x-y plane. As mentioned above, in alternative embodiments, optical conduit 42 may be retained by head gantry 20 with the use of different coupling mechanisms, or may be coupled to a separate gantry mechanism of system 10.

In any of these embodiments, the coupling mechanism (e.g., coupling mechanism 42a) may also include a servo unit, such as servo unit 42b, to move optical conduit 42 relative to print head 18, head gantry 20, and/or any separate gantry mechanism. This servo unit 42b may be used in conjunction with head gantry 20 (or other gantry mechanism) to provide a fine-course positioning for optical conduit 42. For example, servo unit 42b may provide highly-controlled and precise positioning of optical conduit 42, such as in the x-y plane (as shown by arrows 43a), along the z-axis (as shown by arrow 43b), and/or along one or more pivot axes (as shown by arrows 43c).

The pivot axis/axes shown by arrows 43c may be utilized to control that angle of incidence of the laser beam emitted from optical conduit 42, thereby providing greater control over the cut angles. The angle may be adjusted region-to-region so that a single mask position ablates part material to realize non-vertical walls (e.g., as shown with the gear-shaped 3D part 30 in FIG. 1). This is preferable for producing full three-dimensional surfaces. Alternatively, the position of the mask can be corrected slightly shot-to-shot so that a vertical incidence beam can be stepped horizontally as it cuts vertically, realizing a two-and-a-half-dimensional surface.

As shown in FIG. 3, during the printing operation, controller 34 may direct wheels 52 of drive mechanism 44 to selectively draw successive segments filament 50 from consumable assembly 22 or 24 (via guide tube 26 or 28), and feed filament 50 to liquefier assembly 46. Liquefier assembly 46 may include liquefier tube 54, thermal block 56, heat shield 58, and tip shield 60, where liquefier tube 54 includes inlet end 62 for receiving the fed filament 50. Nozzle 48 and tip shield 60 are accordingly secured to outlet end 64 of liquefier tube 54, and liquefier tube 54 extends through thermal block 56 and heat shield 58.

While liquefier assembly 46 is in its active state, thermal block 56 heats liquefier tube 54 to define heating zone 66. The heating of liquefier tube 54 at heating zone 66 melts the part material of filament 50 in liquefier tube 54 to form melt 68. The upper region of liquefier tube 54 above heating zone 66, referred to as transition zone 70, is not directly heated by thermal block 56. This generates a thermal gradient or profile along the longitudinal length of liquefier tube 54. The molten portion of the part material (i.e., melt 68) forms meniscus 72 around the unmelted portion of filament 50.

During an extrusion of melt 68 through nozzle 48, the downward movement of filament 50 functions as a viscosity pump to extrude the part material of melt 68 out of nozzle 48 as extruded roads to print 3D part 30 in a layer-by-layer manner. While thermal block 56 heats liquefier tube 54 at heating zone 66, cooling air may also be blown through a manifold 74 toward inlet end 62 of liquefier tube 54, as depicted by arrows 76. Heat shield 58 assists in directing the air flow toward inlet end 62. The cooling air reduces the temperature of liquefier tube 54 at inlet end 62, which prevents filament 40 from softening or melting at transition zone 70.

Print head 18 typically has a printing speed that is inversely proportional to its printing resolution. For instance, if a higher printing speed is desired, the extruded part or support material needs to be deposited with larger volumetric flow rates, thereby producing wider deposited roads. These wider roads, however, produce 3D parts or support structures having lower resolutions. On the other hand, if a higher printing resolution is desired, this restricts the volumetric flow rate at which the part or support material can be deposited, thereby limiting the printing speed.

Accordingly, there is an inherent tradeoff between printing speeds (volumetric flow rates) and printing resolutions for additive manufacturing systems (e.g., system 10). This is particularly true for deposition-based systems that deposit a material along a single road in a serial manner (as opposed to an array of nozzles).

Figure 4:
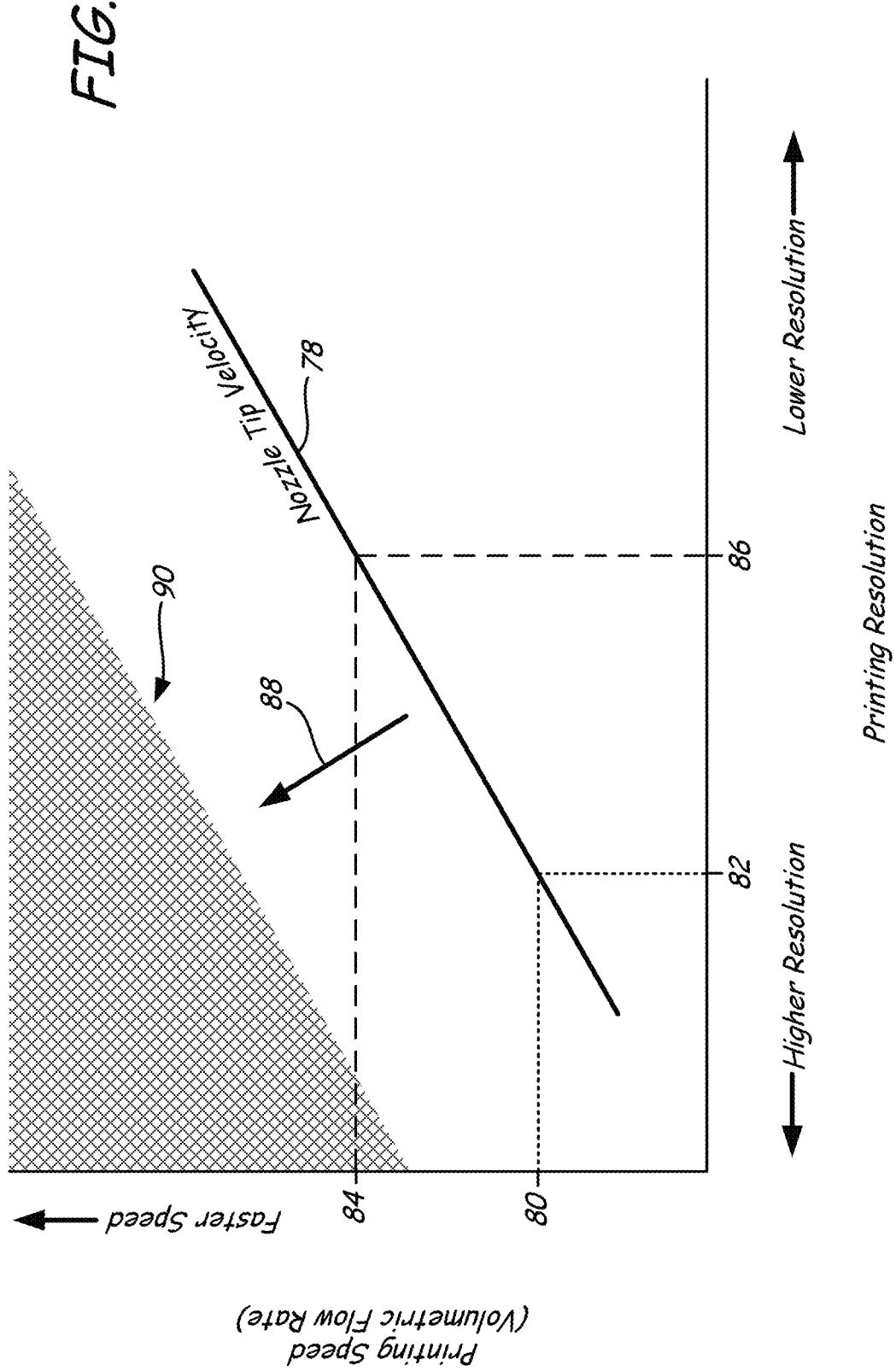
FIG. 4 is a graphical illustration of printing speed versus printing resolution.

This inherent tradeoff is further illustrated in FIG. 4, which shows the relationships between printing speed and printing resolution, where each axis is based on a logarithmic scale. As shown, plot line 78 represents a particular nozzle tip velocity (i.e., print head velocity) along a tool path, which is typically dependent on the speed and agility of gantry mechanism 20. As such, when printing at a first volumetric flow rate 80, the resulting printing resolution that is attainable corresponds to a first resolution 82. Alternatively, if the volumetric flow rate is increased to flow rate 84 (e.g., a wider-diameter nozzle 48 is used), then the resulting printing resolution that is attainable corresponds to a lower resolution 86.

This inverse relationship between printing speed and printing resolution may be improved by utilizing a faster and more agile gantry mechanism (e.g., for higher-end production systems), which will shift plot line 78 in the direction of arrow 88 towards the upper left corner of the graph. However, head gantry 20 can be limited to how fast it can move the print head 18 around in the build plane. This is due to many factors that affect the printing operation, such as hardware and controller limitations, the complexities of the tool paths, melt flow compensations in liquefier assembly 46, material properties, and the like.

This is where the above-discussed laser ablation with laser device 42 can assist the additive manufacturing process. As explained below, it has been found that laser ablation can produce high-resolution features for each printed layer, allowing print head 18 to deposit the materials at a lower resolution (e.g., at resolution 82). This allows print head 18 to extrude the part or support material at the higher volumetric flow rate 84 to improve the printing speed. In fact, this combination of the additive manufacturing and the laser ablation may allow the printing speeds and printing resolutions to fall within region 90 in FIG. 4 (illustrated by cross-hatching), which can exceed the capabilities of current additive manufacturing systems alone.

In general, the time required to build a 3D part by layer-wise extrusion from a nozzle may be determined as follows:

$$\text{Printing Time} \cong \frac{(3D \text{ part volume})}{(\text{Nozzle tip velocity})(\text{Road width})(\text{Road height})} \quad \text{(Equation 1)}$$

Based on Equation 1 and the assumption that the time required to ablate half a road width of the part or support material is determined as follows:

$$\text{Ablation time} \cong \frac{(\text{Laser pulse density})(\text{Part area})}{(\text{Laser power})} \quad \text{(Equation 2)}$$

then the laser ablation may assist the additive manufacturing process when:

$$\frac{(3D \text{ part vlume})}{(\text{Part area})(\text{Road height})} > \frac{(\text{Nozzle tip velocity})}{\frac{(\text{Road width})(\text{Laser pulse density})}{(\text{Laser power})}} \quad \text{(Equation 3)}$$

For example, with a nozzle tip velocity of about 3 inches/seconds, a road width of about 15 mils, a laser power density of about 3 Joules/centimeter$^2$, and a laser power of about a few Watts, then the right side of Equation 3 becomes about 1 (unitless). On the left side, the (3D part volume)/(part area) is roughly the size of the 3D part, such that Equation 3 may condense to:

$$\frac{\text{(Part size)}}{\text{(Road height)}} > 1 \qquad \text{(Equation 4)}$$

The road height is typically based on the extrudate draw and the height of nozzle 48 about the printed layers. So, as can be appreciated by Equations 3 and 4, the addition of the laser ablation can reduce the printing time (and/or improve the printing resolution) under most normal operations. In fact, the laser ablation stops being useful only in extreme situations, such as where the nozzle tip velocity is about 100 inches/second, or if only milliwatts of laser power are used.

Figure 5:
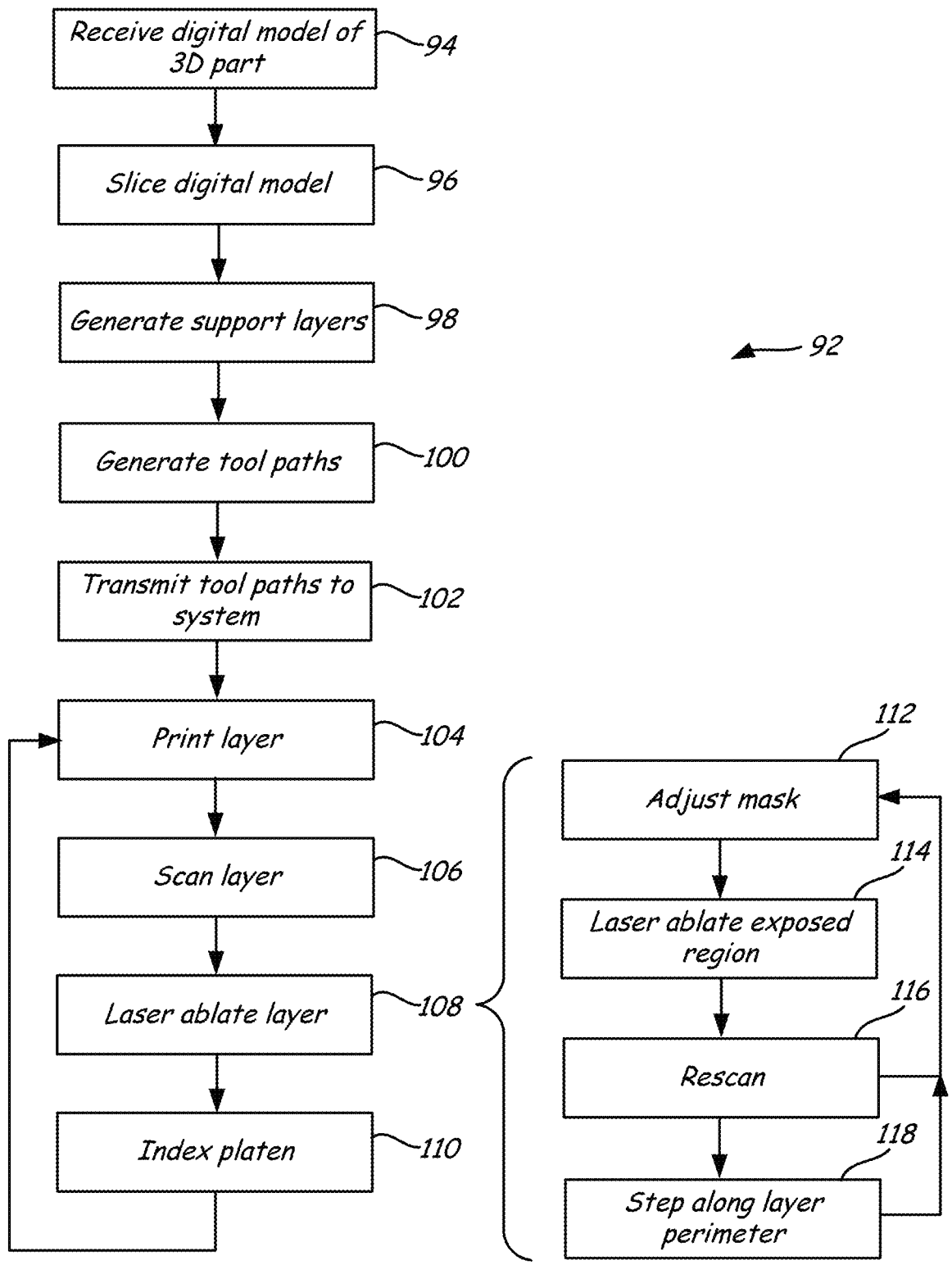
FIG. 5 is a flow diagram of a method for producing 3D parts using a combined additive manufacturing and precision subtractive technique.

FIG. 5 illustrates method 92, which is an example method for producing a 3D part or support structure using the combined additive manufacturing and laser ablation technique. The following discussion of method 92 is made with reference to system 10 (shown in FIG. 1) with the understanding that method 92 may be performed with any suitable additive manufacturing system that is configured to incorporate laser device 40.

As shown, method 92 includes steps 94-118, and initially involves receiving a digital model of a 3D part (e.g., 3D part 30), which is preferably stored on one or more computer storage media of computer 38 (step 94). Utilizing a pre-processing program, computer 38 may then slice the digital model of 3D part 30 into multiple sliced layers corresponding to an intended printing resolution (step 96). Examples of suitable pre-processing programs includes those developed by Stratasys, Inc., Eden Prairie, Minn. under the trademarks "INSIGHT" and "CATALYST".

Computer 38 may then use the pre-processing program to generate layers for support structure 32 (step 98), create perimeter geometries for each sliced layer, generate tool path instructions (and/or any other printing information) for 3D part 30 and support structure 32 (step 100), and transmit the information (e.g. tool paths) to system 10 (step 102). Upon receipt of the information, system 10 may then print 3D part 30 and support structure 32 onto platen surface 14a based on the received information, in coordination with the laser ablation, pursuant to steps 104-118.

An example application of method 92, and particularly steps 104-118, will be further discussed below with reference to FIGS. 6A-6J. Briefly, system 10 may initially print a layer of the 3D part 30 (and/or support structure 32), such as with a series of deposited roads of the part material (or support material) (step 104). The printed layer may then be optically scanned to generate a scanned map of the printed layer (step 106).

Preferably, laser device 40 performs the optical scanning with the use of optical conduit 42, and may communicate with computer 38 to transmit the scanned map to computer 38. Alternatively, system 10 may include a separate optical scanning system to perform the scanning in step 106. In this embodiment, the separate optical scanning system may reside in, or adjacent to chamber 12, and may communicate with controller 34, computer 38, and/or laser device 40 to transmit the scanned map.

From there, computer 38 and/or laser device 40 may compare the scanned map to the sliced layer corresponding the printed layer to determine if there are any regions of excess material to be removed. This determination may based on a difference threshold corresponding to the laser ablation resolution. As such, if a difference at a given location in the x-y plane between the scanned map and the sliced layer is less than the resolution attainable with the laser ablation, then it can be ignored.

In the event that there are no regions of excess material to be removed, system 10 may skip the laser ablation step 108 for the current layer by indexing platen 14 downward by a single increment (step 110), and proceeding to print the next layer (step 104). On the other hand, if computer 38 determines that there are one or more regions of excess material to be removed, computer 38 and/or laser device 40 may then perform the laser ablation on the given region(s) for the current layer (step 108), as illustrated by steps 112-118.

This preferably involves adjusting the mask unit for laser device 40 to spatially modulate the resulting laser beam (step 112). In particular, the mask may be set to expose a portion of the region of excess material, such as at a given voxel to be ablated. For instance, an excimer laser beam pulsed at a frequency of 1,000 pulses per second with a power of 0.1 Joules/pulse may ablate away a voxel size of 0.1 mils (x-axis)×0.1 mils (y-axis)×0.01 mils (z-axis) per pulse.

Laser device 40 may then operate to ablate the deposited material of the printed layer at the current voxel coordinate in the x-y plane for a preset number of pulses (step 114). After the laser ablation step is completed, then the printed layer, the excess region, and/or the current voxel may then be re-scanned to generate an updated scanned map to see how much excess material is remaining for the current layer (step 116). Preferably, to maintain high resolutions, steps 112-116 are repeated multiple times for each voxel coordinate in the x-y plane such that each ablation step cuts away a portion of the current layer at the current voxel coordinate (e.g., 10-100 pulses per rescan).

When the excess material at the current voxel coordinate is completely removed, then the laser beam focus may be stepped over to the next voxel in the layer perimeter (step 118). Steps 112-118 may then repeated until all of the excess material in the current layer is removed. This results in the high-resolution exterior and/or interior perimeters for the current layer. System 10 may then index platen 14 downward by a single increment (step 110), and proceed to print the next layer (step 104). The same process for steps 104-118 may then be repeated for each successive layer.

Figure 6A:
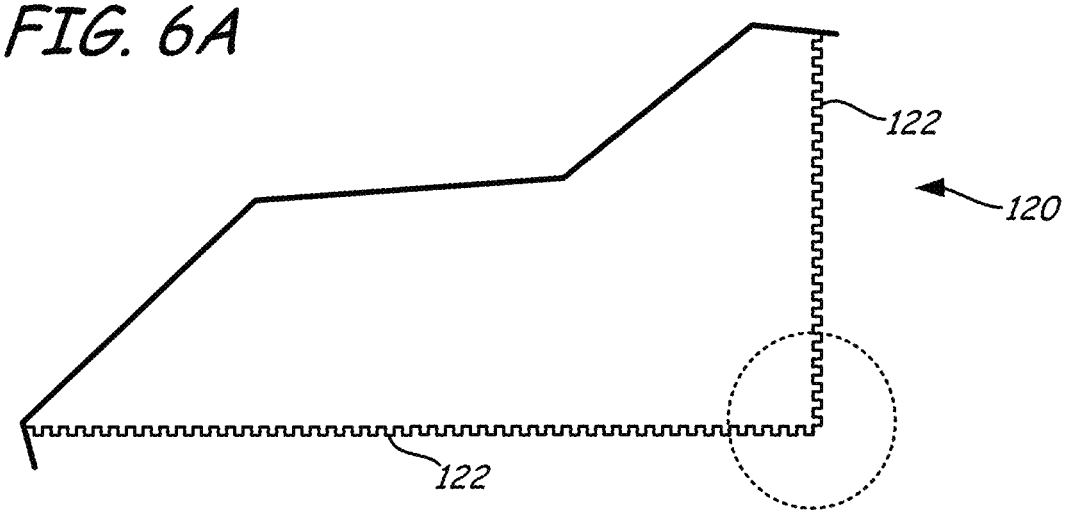
FIGS. 6A-6J are schematic illustrations that describe an application of the methods shown in FIG. 5.
Figure 6B:
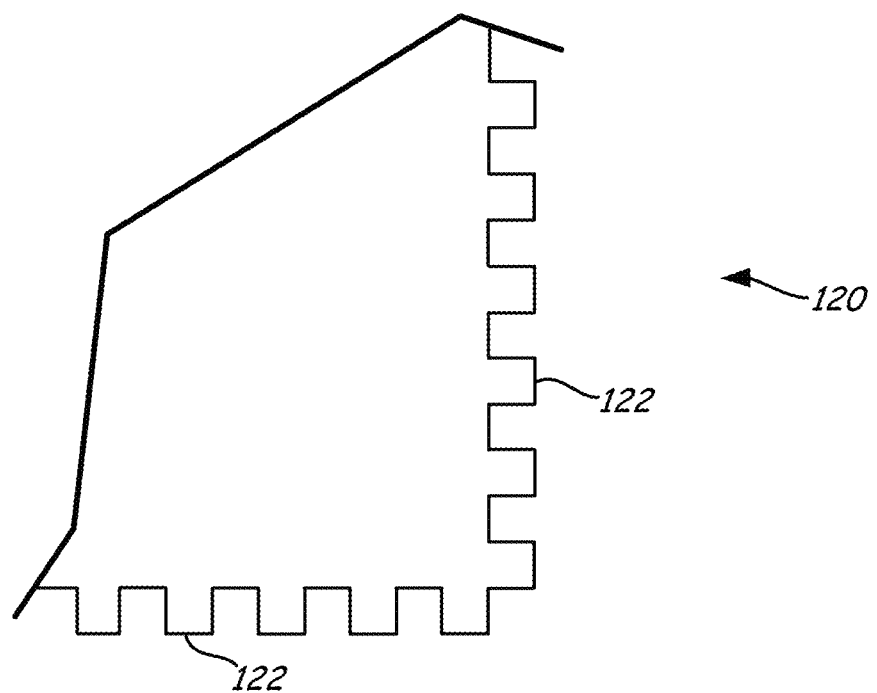

FIGS. 6A-6J illustrate an example application for performing the steps of method 92. FIGS. 6A and 6B show an example sliced layer 120 having a perimeter 122 with high-resolution teeth-like features that a customer wishes to have shown in full detail. If system 10 were to print a 3D part having layers corresponding to sliced layer 120, with the feature resolution required to produce perimeter 122 with the shown geometry, print head 18 would be required to utilize a very small nozzle 48, and the printing speed would be slow. This would result in an extended printing duration, which can increase the time-material costs for printing the 3D part. This is particularly true if the 3D part is large.

Figure 6C:
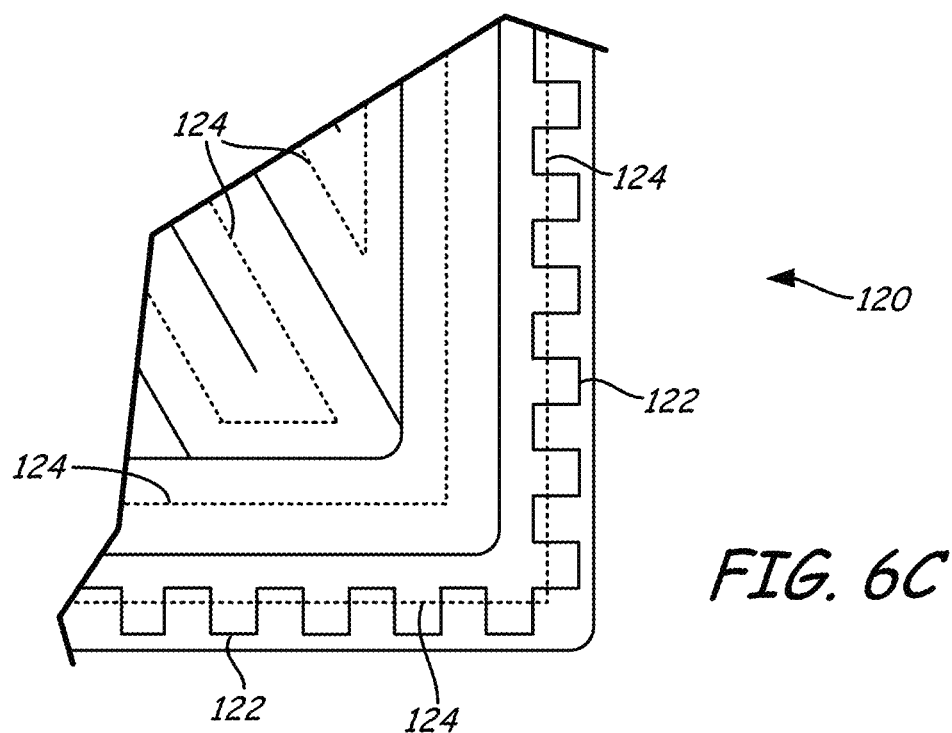

Instead, as shown in FIG. 6C, computer 30 may generate tool paths 124 for printing a series of roads for sliced layer 120, pursuant to step 100. Tool paths 124 are preferably generated to overfill perimeter 122, particularly at any high-resolution features of layer 120 (e.g., the teeth-like features) to ensure the deposited material covers these features. Furthermore, as shown in FIG. 6C, tool paths 124 may be generated based on a printing resolution (e.g., road width and sliced layer thickness) that is lower than a resolution that is required to produce the teeth-like features with their shown geometries. As discussed above, this can substantially increase the printing speed for printing the 3D part.

Furthermore, as shown, to reduce the risk of exposing any interior porous regions in the layer, the teeth-like features preferably reside entirely within the perimeter roads defined by tool paths 124. More preferably, the teeth-like features preferably reside entirely within the outermost perimeter road defined by tool paths 124, as also shown.

In addition to using a lower printing resolution, tool paths 124 may also be generated to reduce the tightness and number of corners that print head 18 will be required to follow. This can also increase printing speeds by allowing head gantry 20 to move print head 18 at higher speeds without having to slow down as much to traverse the corners.

Figure 6D:
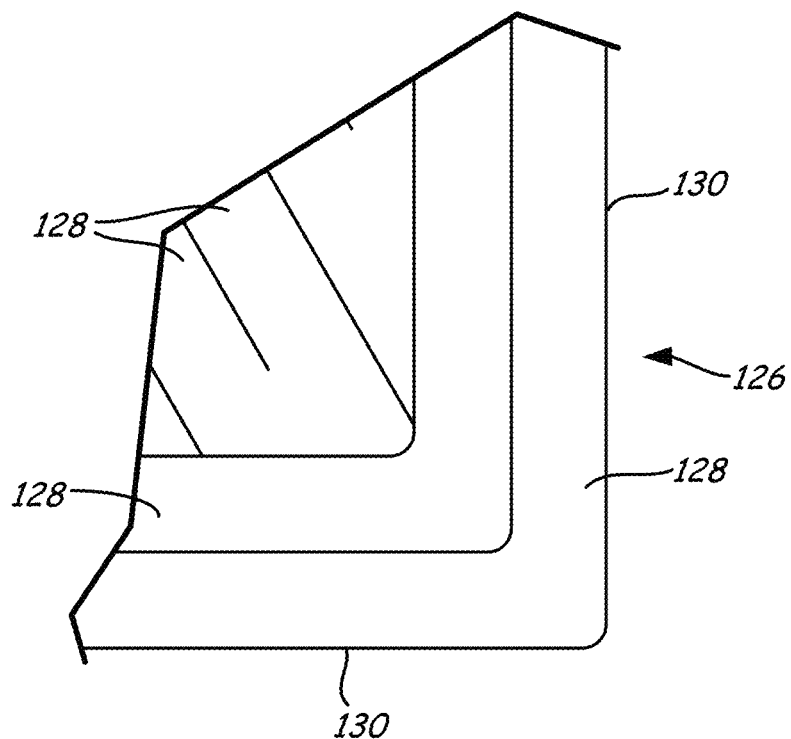

As shown in FIG. 6D, upon receipt of the printing instructions (step 102), system 10 may print layer 126 (step 104). This may involve moving print head 18 along the coordinates of tool paths 124 (shown in FIG. 6C), and depositing the part or support material to produce roads 128. The resulting roads 128 accordingly have an average road width corresponding the printing resolution used. As also shown, roads 128 for layer 126 are deposited in an overfill manner that extends in the x-y plane beyond the intended geometry of perimeter 122.

Layer 126 may then be optically scanned (e.g., via laser device 40), pursuant to step 106, which identifies the exterior and interior perimeters of the printed layer, such as perimeter 130, with a resolution that preferably corresponds to the image resolution of laser device 40. The resulting scan may be stored in one or more computer devices, such as computer 38 and/or an internal storage unit of laser device 40.

Figure 6E:
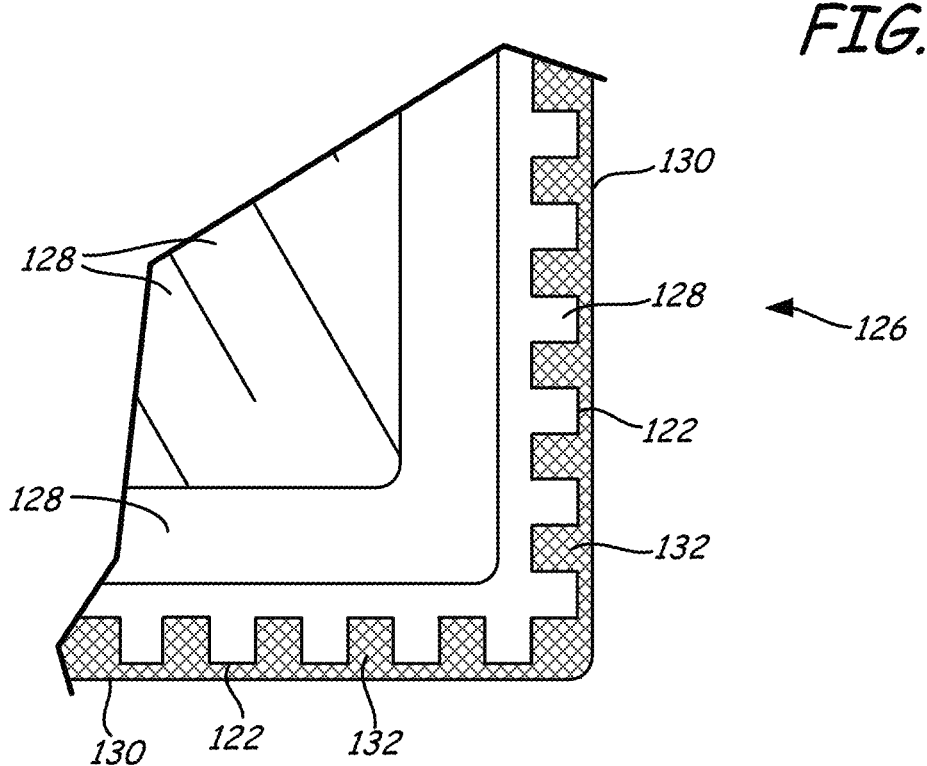
Figure 6F:
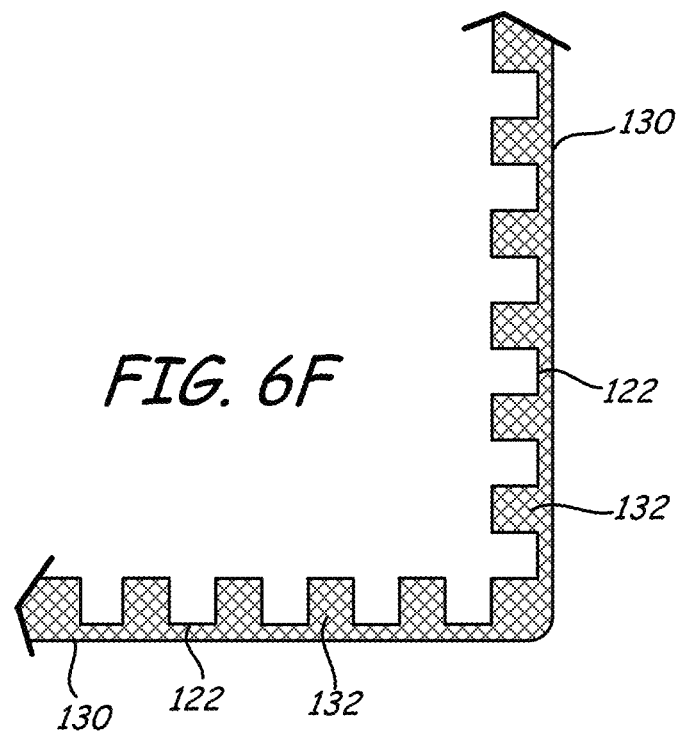

Computer 38 and/or laser device 40 may then compare the scan of layer 126 to sliced layer 120 (or any other corresponding image of sliced layer 120) to identify the region(s) of excess material. For example, as shown in FIGS. 6E and 6F, this comparison identifies excess region 132 (illustrated with cross-hatching), which is based on the difference between perimeter 130 of printed layer 128 and perimeter 122 of sliced layer 120 in the x-y plane.

Figure 6G:
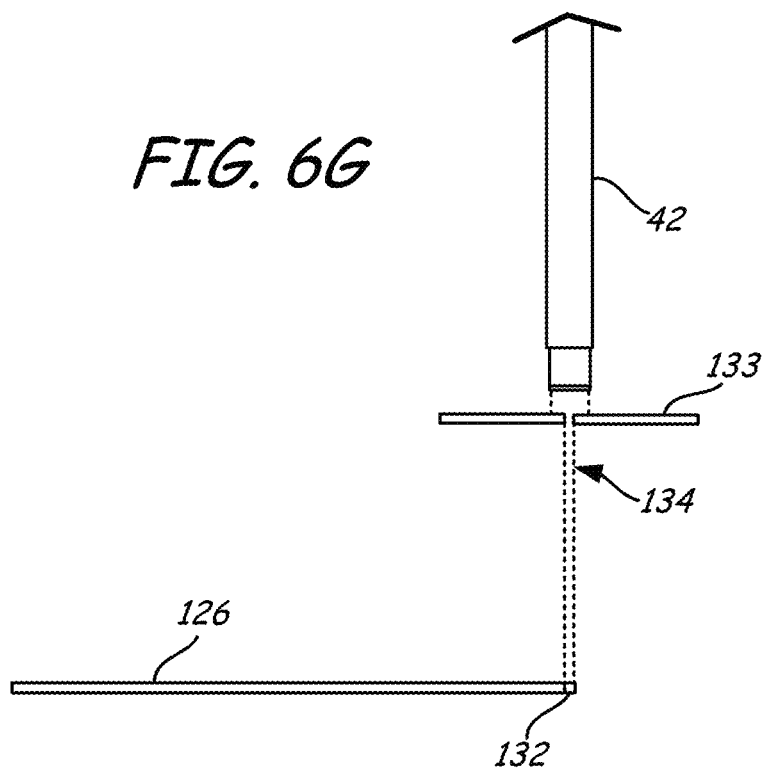
Figure 6H:
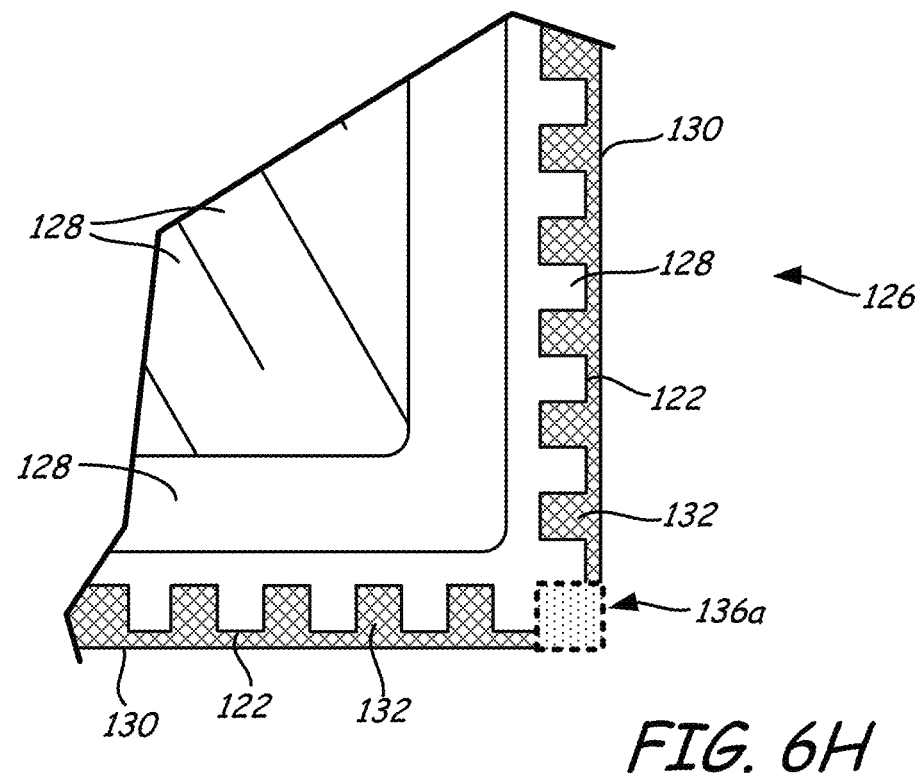

Computer 38 and/or laser device 40 may then adjust a mask for laser device 40 to spatially modulate the resulting laser beam using a mask projection technique (step 112). For example, as shown in FIG. 6G, a mask 133 may be set to expose a portion of the excess region 132, such as a particular voxel to be ablated. Controller 34 may also direct head gantry 20 (and/or servo unit 42b) to move optical conduit 42 to the designated voxel coordinates in excess region 132, such as at voxel 136a shown in FIG. 6H, in coordination with spatially modulating mask 133.

Laser device 40 may pulse laser beam 134 to perform the laser ablation (step 114) for a preset number of pulses (step 114). After the laser ablation step is completed, then the printed layer 126, the excess region 132, and/or the current voxel 136a may then be re-scanned to generate an updated scanned map to see how much excess material is remaining for the current layer 126 (step 116). As mentioned above, steps 112-116 are preferably repeated multiple times for each voxel coordinate in the x-y plane such that each ablation step cuts away a portion of the current layer at the current voxel coordinate (e.g., 10-100 pulses per rescan).

In particular, the pulses of energy from laser beam 134 are absorbed by the part or support material of printed layer 126, causing the material to rise above its ionization temperature. When the deposited material exceeds its ionization temperature, the affected material becomes a gaseous plasma that vaporizes from the remainder of the printed layer 126. However, the ablated material does not fall onto the platen 14 or layer 126, and therefore, does not interfere with the processing of the successive layers of the 3D part or support structure.

Because the amount of energy can be controlled by directing a selected number of pulses at a selected energy or power density, the depth of the removal of material can be controlled such that the energy does not penetrate into any adjacent lower layer. Therefore, the ablation preferably does not ablate any layer below layer 16, or platen 14. For example, a suitable excimer laser device for device 40 may produce light energy at a pulse frequency of about 2,000 pulses/second to deliver about 10 Watts of power. As such, each pulse may produce about 5 milliJoules/pulse of power, and when focused at a 0.05-inch diameter area, the laser beam pulse may deliver about 0.18 Joules/square-centimeter ($J/cm^2$).

Based upon the characteristics of typical thermoplastic materials, a laser beam pulse having a power density of about 0.18 $J/cm^2$ will ablate about 0.3 micrometers of the material per pulse, or about 10 microcubic inches (mics) of the material per Joule. Therefore, a laser beam 134 that produces 10 Watts of power will remove about 100 mics/second of the material.

By way of example, for an additive manufacturing system to print a 4-ounce part of an ABS part material with an average road width of about 100 mils and a layer thickness of about seven slices, along with a print head velocity of about 2.5 inches/second, this printing requires about 30,000 seconds to complete. In comparison, even assuming as much as 30% of the printed 3D part is ablated with laser device 40, where laser beam 134 removes about 100 mics/second of the material, laser device 40 is capable of completing the ablation in about 3,200 seconds, which is about eight times faster than the part deposition time. Moreover, resulting 3D part may have a surface resolution of a few micrometers rather than a few mils, providing an equivalent resolution to about a 0.1-slice part.

Accordingly, suitable power densities for laser beam 134 may range from about 0.01 $J/cm^2$ to about 10 $J/cm^2$ and more preferably from about 2 $J/cm^2$ to about 3 $J/cm^2$. As can be appreciated, utilizing a larger power density allows for more material to be converted to a gaseous plasma and removed from the printed layer 126. Hence, the larger the power density, the faster the edges of layer 126 can be defined by laser beam 134.

However, in order to maintain a clean, even edge, the rate of travel of the laser beam 134 in the x-y plane is limited to a rate that is dependent upon the power density of the pulses and the compositional properties of the material. For example, for an ABS part material and a power density of 2.7 $J/cm^2$, the rate at which laser beam 134 may travel in the x-y plane ranges from about 0.001 micrometers/pulse and about 0.5 micrometers/pulse. Furthermore, the frequency and intensity of the pulses dictate the depth at which the laser beam 134 may remove material and define the edge of layer 126. Therefore, the amount of material that is removed is also dictated by the compositional properties of the material being subjected to the laser energy.

Furthermore, in order to obtain the desired edge, the laser beam pulses preferably have a precise depth of focus or low numerical aperture, as illustrated above in FIG. 6G. A low numerical aperture provides for straighter, vertical cuts relative to a larger numerical aperture. Otherwise stated, a laser beam 134 with a tight and precise depth of focus will tend to apply energy at a precise location and angle, and provides for clean, vertical cuts. If energy is provided beyond the desired boundary such as for instance, a laser beam 134 with a higher than required numerical aperture, the edge may have an undesired slant, which could adversely affect the quality of the 3D part.

Figure 6I:
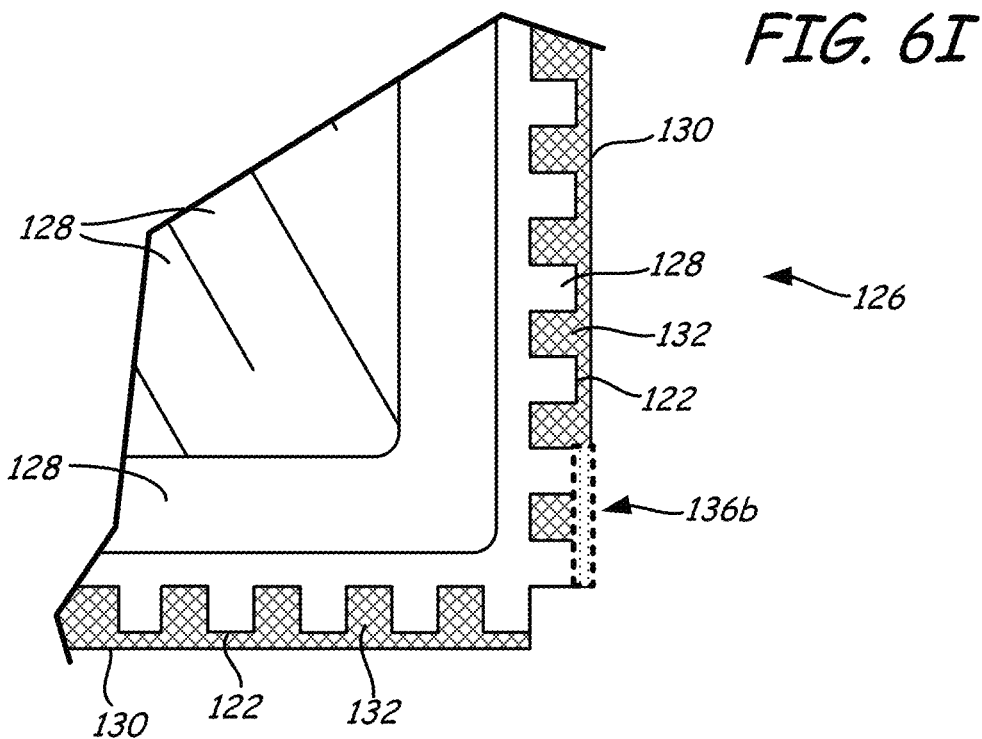

When the excess material at the current voxel coordinate is completely removed, then the laser beam focus may be stepped over to the next voxel in the layer perimeter (step 118). For example, as shown in FIG. 6I, controller 34 may also direct head gantry 20 (and/or servo unit 42b) to move optical conduit 42 to the next designated voxel coordinates in excess region 132. Mask 133 is also preferably spatially modulated to ablate a suitable size of excess region 132 at the voxel coordinates, such as at voxel 136b, which can have different dimensions than voxel 136a (step 112).

Figure 6J:
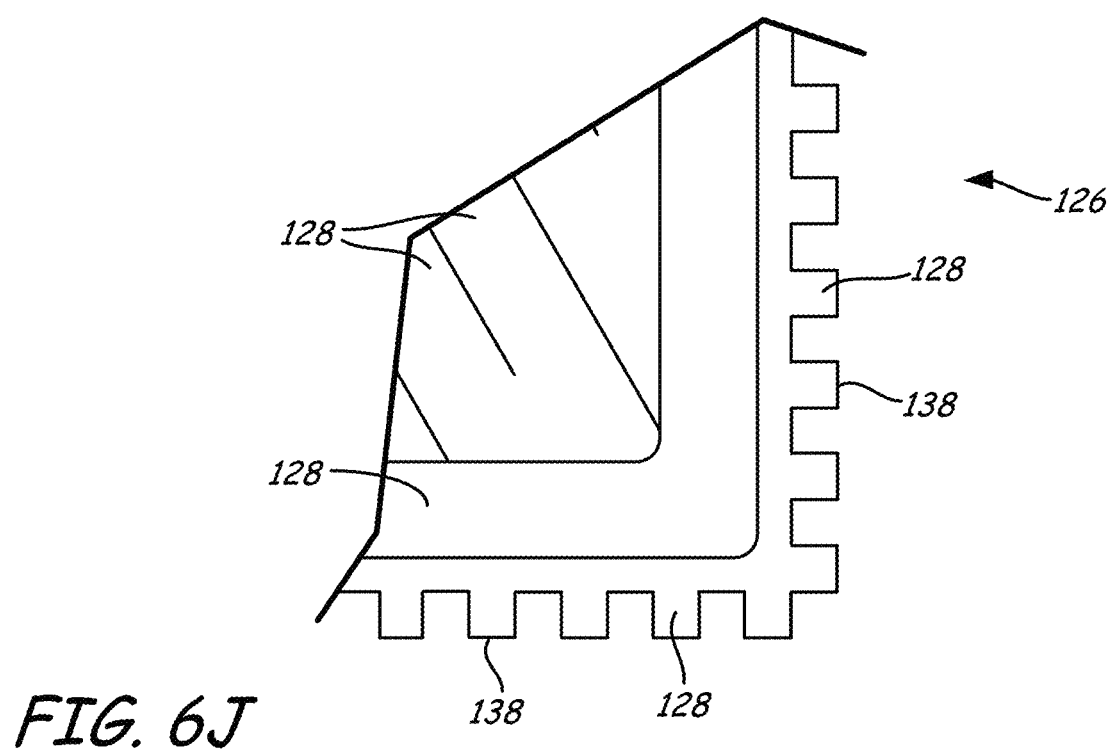

Steps 112-118 may then repeated until all of the material of excess region 132 is removed, as shown in FIG. 6J. This results in a high-resolution exterior perimeter 138 corresponding to perimeter 122 of sliced layer 120, which includes the high-resolution teeth-like features. This is in addition to the faster printing speeds attained while printing roads 128 at the lower printing resolutions. As such, the combined additive manufacturing and laser ablation technique produces high-resolution 3D parts and support structures with fast printing speeds, which is not currently achievable with the additive manufacturing process alone.

In addition, other subtractive manufacturing techniques, such as heating or machining, are insufficient to produce the high-resolution features at fast printing speeds. For example, heating 3D part 30 or support structure 32, such as with infrared heat, tends to cause the deposited material to melt in bulk, which does not produce the resolutions. Furthermore, many part materials, such as curable jetting or stereolithography-based materials, may have glass transition temperatures that are too high in their cross-linked states to be thermally treated.

Moreover, it has been found that machining the deposited layer near the glass transition temperature of the material does not provide a clean edge, but rather tends to cause the edge of the layer to generally creep or ooze. Additionally, physical cutting processes tend to provide localized stresses that can cause delocalized stresses and strains in a layer, which can cause the part to be defective. This is in addition to the space requirements in chamber 12, which can physically prevent a cutting instrument from being utilized.

In addition to producing high-resolution features, laser device 40 may also be used to treat the 3D parts and/or support structure in other manners. For instance, in some embodiments, the laser ablation may be used to relieve curling in the 3D parts and/or support structures. During the printing steps, the part material is melted and extruded as a series of roads, which cool down to form layers of a 3D part. Due to the layer-by-layer nature of the printing, the cooling of each successive layer generates residual stresses in the 3D part, which are a function of the coefficient of thermal expansion, percent shrinkage, and tensile modulus of the part material. If not relieved, the residual stresses may physically distort the 3D part, such as by causing the edges and corners of the 3D part to curl up, referred to as "curl" or "curling".

Accordingly, the laser ablation can reduce curling by ablating one or more stress-relieving trenches across the printed layers, which can allow the top layer(s) to contract by opening the trenches. This laser ablation step may be performed after one or more layers are printed, preferably after multiple layers are printed to reduce the overall time required to produce the 3D part. After the trenches have sufficiently opened, a subsequent printing step may be performed to fill the trenches.

In other embodiments, laser device 40 may be used to produce copyrightable or otherwise recognizable marks (e.g., stenographic marks) that are preferably buried within the layers of the 3D part and/or support structure. This can allow copyright owners to identify when someone has misappropriated their valuable designs, works of art, and the like. For example, a given recognizable mark may be created in the digital model of the 3D part, which is then ablated into the layers while producing the 3D part with system 10. If the copyright owner believes another user has misappropriated the copyright owner's digital model, the produced 3D part may be inspected with a non-destructive scanning technique and/or a destructive scanning technique (e.g., cross-sectional scanning) to determine whether the recognizable mark is present.

The above discussion focuses on laser device 40 being external to the housing of system 10, and capable of operating with the use of optical conduit 42. However, in alternative embodiments, laser device 40 may be integrated into system 10 such that controller 34 and computer 38 may directly control laser device 40. In this embodiment, the portion of laser device 40 configured to emit laser beam 134 may retained by head gantry 20, or may be retained by a separate gantry mechanism.

In an alternative embodiment, laser device 40 may be stationary or have limited motion, and platen 14 itself may move 3D part 30 and/or support structure 32 in the x-y plane below laser device 40. This embodiment is beneficial for use with the fine-course positioning with servo unit 42b (shown in FIG. 2).

Figure 7:
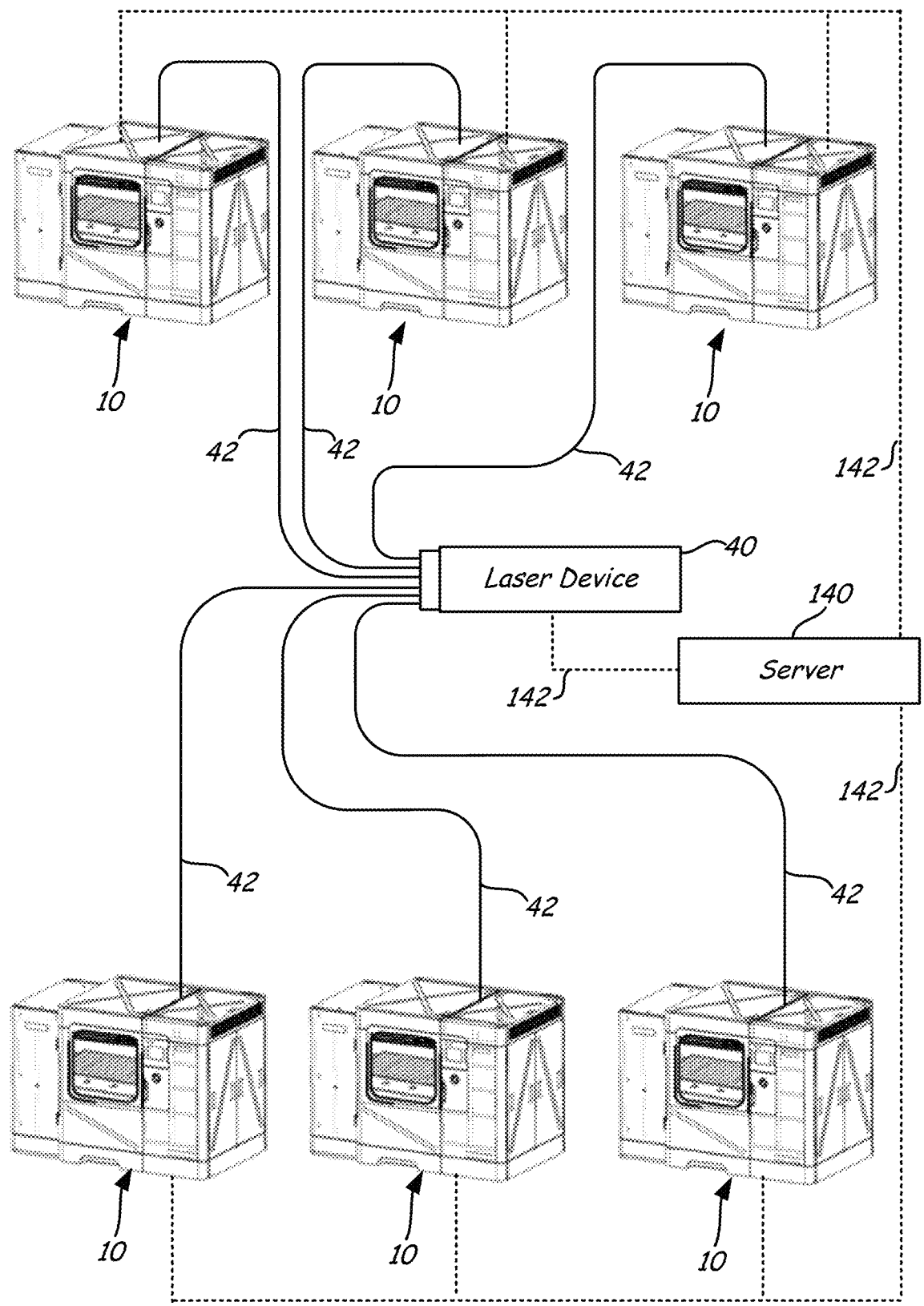
FIG. 7 is a schematic illustration of a laser device in use with a farm of multiple additive manufacturing systems.

Nonetheless, due to the high costs of commercial laser devices, such as excimer laser devices, laser device 40 is preferably located outside of the housing of system 10, allowing a single laser device 40 to be used with a farm of multiple additive manufacturing systems 10, such as shown in FIG. 7. In this scenario, laser device 40 may include one or more optical conduits 42 for each system 10, where the operation with each system 10 may be managed by server 140, which may communicate with laser device 40 and each system 10 over one or more communication lines 140. Suitable systems for server 140 and communication lines 142 include those discussed above for computer 38 and communication lines 36.

In this case, server 140 may include a scheduling program that manages when laser device 40 is required for any of systems 10. In fact, server 140 may manage the operations of systems 10 and laser device 40 such that the use of laser device 40 is staggered between the various systems 10, subject to a suitable duty cycle for laser device 40. For example, while a first system 10 is printing a layer of a 3D part, laser system 40 may conduct a laser ablation process on one or more other systems 10 until the first system 10 is ready for utilize it. Then server 140 may direct laser device 40 to conduct the laser ablation process on the recently printed layer in the first system 10.

This interchange between the different systems 10 is preferably performed in a manner that reduces the overall printing times for the farm of system 10, subject to duty cycle and maintenance limitations. Moreover, two or more laser devices 40 may operate in tandem with the farm of systems 10 to further improve the part production efficiencies.

Although the present disclosure has been described with reference to preferred embodiments, workers skilled in the art will recognize that changes may be made in form and detail without departing from the spirit and scope of the disclosure.

The invention claimed is:

1. An additive manufacturing system for producing printed parts, the system comprising:
   an extrusion head configured to move in three dimensions relative to a print surface and to print portions of a part by depositing molten part material onto the print surface along tool paths defined by a digital model of the part, wherein the part material cools to a solid state at a first resolution onto the print surface;
   a radiation-emitting device configured to emit radiation sufficient to ablate selected voxels of the printed portions of the part and having a sufficient resolution such that ablated printed portions will have a second resolution that is higher than the first resolution;
   a scanner configured to scan the printed portions of the part and
   at least one controller configured to manage operations of the extrusion head and the radiation-emitting device, wherein the controller is configured to generate a scanned map based upon data captured in the scan and to identify at least one region of difference between the scanned map and the digital model, and wherein the selected voxels of the printed portions of the part are located where a region of difference is identified.

2. The system of claim 1, and further comprising a masking unit configured to spatially modulate the emitted radiation towards the selected voxels.

3. The system of claim 2, wherein the controller is further configured to adjust the spatial modulation of the masking unit.

4. The system of claim 1, wherein the radiation-emitting device comprises an excimer laser device.

5. The system of claim 1, wherein the scanner is incorporated into the radiation-emitting device.

6. The system of claim 1, wherein the additive manufacturing system further comprises a print environment, and wherein the radiation-emitting device is located outside of the print environment.

7. The system of claim 1, wherein the radiation-emitting device is configured to emit the laser beam pulses with an average power density ranging from about 0.01 J/cm$^2$ to about 10 J/cm$^2$.

8. The system of claim 1, wherein the printed portions of the part comprise one or more part layers.

9. The system of claim 1, wherein the printed portions of the part comprise the entirety of the printed part.

* * * * *